Sept. 1, 1925.

J. VERSTEEG 1,552,362

FARMING IMPLEMENT

Filed Feb. 21, 1924

WITNESSES
H. J. Walker
W. A. Williams

INVENTOR
John Versteeg
BY
Munn & Co.
ATTORNEYS

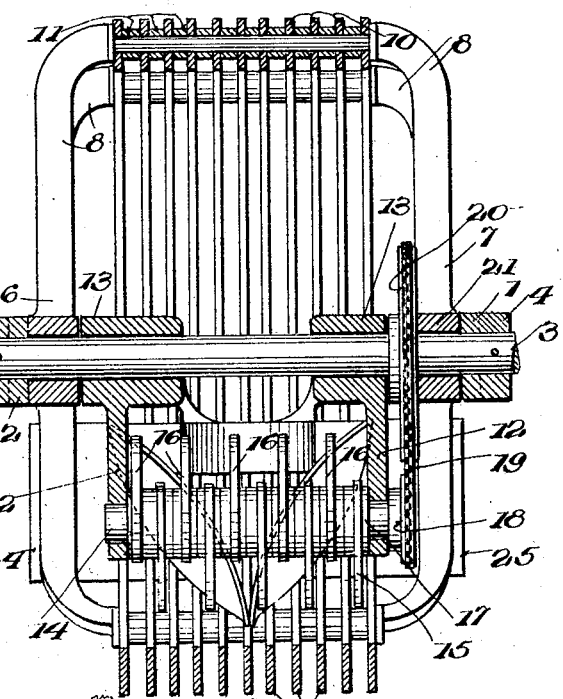

Patented Sept. 1, 1925.

1,552,362

UNITED STATES PATENT OFFICE.

JOHN VERSTEEG, OF PORTLAND, OREGON.

FARMING IMPLEMENT.

Application filed February 21, 1924. Serial No. 694,346.

*To all whom it may concern:*

Be it known that I, JOHN VERSTEEG, a citizen of the United States, and a resident of Portland, in the county of Multnomah and State of Oregon, have invented certain new and useful Improvements in Farming Implements, of which the following is a specification.

This invention relates to farming implements and has for its object the provision of a device for disintegrating the soil and combining the features of a clod crusher, a soil pulverizer, a soil mixer and finally a soil surfacer.

A further object of the invention is the provision of a farming implement for disintegrating the soil and in which the soil is first broken up and pulverized and then delivered to a surfacer for replacing the soil.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

In the drawings:

Figure 3 is a vertical section of my farming implement on the line 3—3 of Figure 1.

Figure 1:
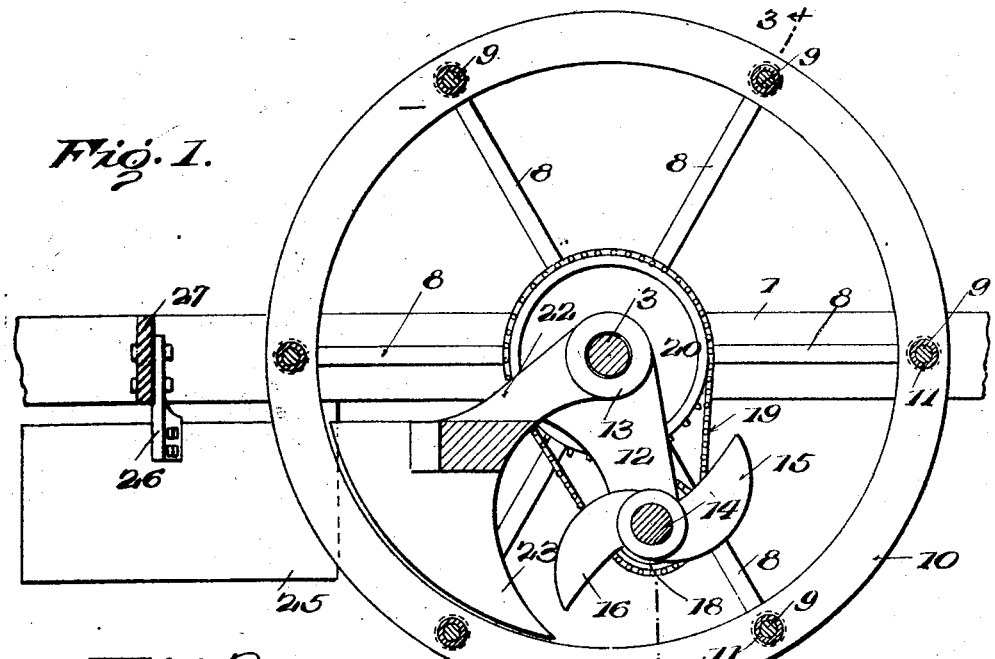
Figure 1 is a vertical section of my improved farming implement taken along the line 1—1 of Figure 2.

Figure 4 diagrammatically shows a gang of the farming implements.

Referring more particularly to the drawings, 1 and 2 designate the side members of the frame in which is rigidly mounted an axle 3. Where the axle passes through the side members the same are provided with perforated bosses 4 having a set screw 5 for locking the shaft against rotation in said side member. A pair of spiders 6 and 7 having centrally disposed hubs mounted for rotation on the axle 3 and radiating arms 8 having their outer ends turned inwardly and with pairs of the alined arms connected by rods 9.

A plurality of rings 10 are provided with spaced perforations which are adapted to receive the rods 9 and collars 11 are mounted on the rods and between the various rings 10 for maintaining the rings in spaced relation.

A hanger 12 is provided with sleeves 13 at its upper end which receives the axle 3 whereby the hanger is supported from said axle. The lower end of the hanger is provided with bearings for carrying a counter shaft 14. Rigidly connected with the shaft 14 and mounted for rotation with the shaft are blades 15 and 16 extending in opposite directions from each other. These blades are provided at their inner ends with hubs 17 which are rigidly connected with the shaft 14 and are of sufficient length to maintain the blades in spaced relation.

Upon the outer end of the shaft 14 is a sprocket 18 adapted to be driven by a chain 19 from a sprocket wheel 20. The hub 21 of the sprocket wheel 20 is mounted for rotation with the spiders 6 and 7.

Depending rearwardly from the hanger 12 is a bracket 22 and carrying plow shares 23 which extend rearwardly in flaring relation and terminate at the outer rings 10. It will be seen in Figure 1 that the lower ends of the shares are curved coincident to the curvature of the inner periphery of the rings 10, extend across said peripheries and terminate short of said peripheries so that the plow shares operate within the rings 10 and rearwardly of the axle 3. The shares merge into a sharp edge at their forward end and thereby provide a V-shaped plow share for forcing the soil outwardly and through the rings 10 at the rear of the axle 3.

A pair of plow shares 24 and 25 are disposed at an acute angle towards each other and connected by means of brackets 26 to a transverse bar 27 connected between the side frames 1 and 2. These shares are straight pieces of material and extend downwardly and are adapted to engage the soil that has been thrown outwardly by the plow shares 23 and return the same to its normal position and act as a surfacer for levelling the pulverized soil.

As shown more particularly in Figure 4, when desired a gang of the plows may be employed in such a manner that a pair of them are connected together on the same axle located forwardly while a pair of plows are located rearwardly on another axle and with the intermediate connecting portion of the frames 1ᵃ and 2ᵃ so distorted as to offset the rear cultivators in staggered relation with the forward cultivators whereby all portions of the soil covered by the plows will be thoroughly worked for farming purposes.

Figure 2:
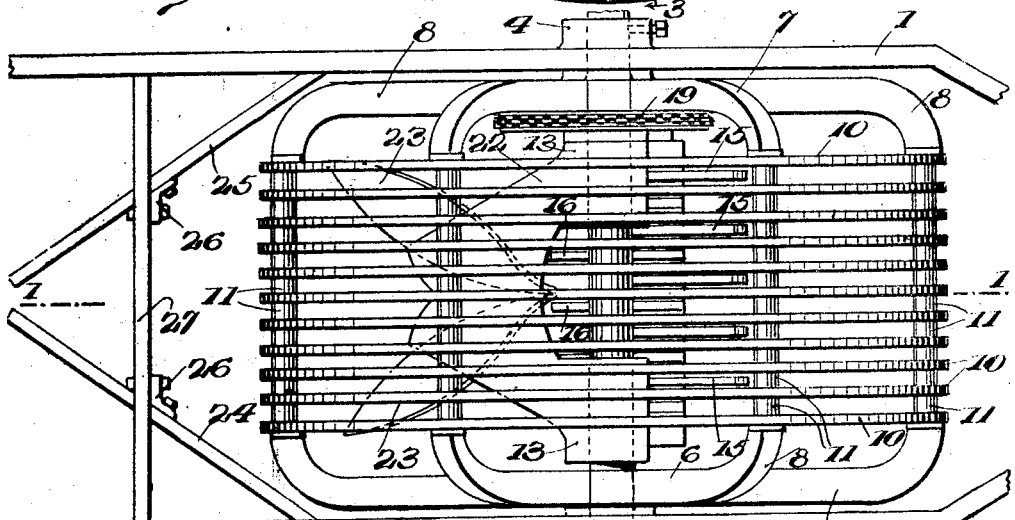
Figure 2 is a plan view of the same.

It will be seen that one section 2ᵃ of the frame is extended rearwardly and supports the axle 3ᵃ while the other side member 1ᵃ of the frame is extended rearwardly and turned off at an angle between the pairs of plows and extended parallel to the straight portion of the frame 2ᵃ and forming the direct support upon the one side of a plow of the rear pair of plows. The side member 2ᵃ of the other forwardly positioned plow is extended rearwardly and forms the side frame member of the rear plow which corresponds to the side member 1ᵃ of the plow shown in Figure 2.

The operation of my device is as follows:

The plow is drawn over the land and weighted down sufficiently, depending, of course, upon the depth to which it is desired to cut. The soil is cut and forced upwardly between the cutting rings 10 and delivered on the inside of the peripheries of the rings and then broken up and mixed by the sets of rotating hoes 15 and 16 which operate within a space bounded by the rings 10. The series of rings form what I term an apparent drum within which the hoes 15 and 16 and the plow shares 23 operate. The soil is worked backwardly towards the double-shared plows or scrapers and these scrapers force the soil out of the ends of the drum formed by the rings and between the spokes 8 of the webs 6 and 7. The inner curved portions of the spokes aid in causing the soil to be carried outwardly of the interior of the drum. The soil is then retrieved by the straight plow shares 24 and 25, which not only return the soil to its normal position but act as levellers and eveners for said soil.

It will be seen that the soil which has been treated by my device is left in a light and loose condition and is not tamped or packed by any part of the machine after it has delivered the soil from the second set of scrapers and it will also be understood that both the top and sub-soil becomes thoroughly mixed in the process.

Instead of the collars 11 for spacing the rings 10 from each other, the rings may be provided with bosses which are adapted to be formed integrally with one face of the ring and may be equally well employed for spacing the ring.

Since the spiders 6 and 7 revolve with the cutting rings the cutting rings being caused to be revolved by the implement being drawn over the ground, the sprocket wheel 20 carried by the spider 7 is revolved driving wheel 18 and shaft 14 through chain 19 whereby the cutting hoes 15 and 16 carried by shaft 14 are operated.

What I claim is:

1. A farming implement comprising an axle, a frame carrying the axle, a pair of spiders rotatable on the axle, spaced cutting rings carried by the spiders and caused to be rotated by the implement travelling over the ground, cutting hoes revolubly mounted within the cutting rings, means operatively connecting the cutting hoes with the spiders for causing rotation of said hoes, a plow share mounted within the space defined by the inner periphery of the rings for driving the soil in opposite lateral directions, and plow shares at the rear of and beyond the effective action of the rings for returning the pulverized soil to a normal level position.

2. A farming implement comprising an axle, a frame carrying the axle, a pair of spiders rotatable on the axle, spaced cutting rings carried by the spiders and caused to be rotated by the implement travelling over the ground, cutting hoes revolubly mounted within the cutting rings, means operatively connecting the cutting hoes with the spiders for causing rotation of the hoes, means mounted within the space defined by the inner peripheries of the rings for driving the soil in opposite lateral directions and through the spiders, and means at the rear of and beyond effective action of the rings for returning the pulverized soil to its primary position.

3. A farming implement comprising an axle, a frame carrying the axle, a pair of spiders rotatable on the axle, spaced cutting rings carried by the spiders and caused to be rotated by the implement travelling over the ground, cutting hoes revolubly mounted within the cutting rings, and means operatively connecting the cutting hoes with a spider for causing rotation of the hoes, means mounted within the space defined by the inner periphery of the ring for driving the soil in opposite lateral directions and through the spiders.

4. A farming implement comprising an axle, a frame carrying the axle, a pair of spiders rotatable on the axle, spaced cutting rings carried by the spiders and caused to be rotated by the implement travelling over the ground, cutting hoes revolubly mounted within the cutting rings, means operatively connecting the cutting hoes with a spider for causing rotation of the hoes, means connecting the rings for simultaneous rotation, said cutting hoes being located within the spaces between the rings and having their effective cutting action limited to a radius which is less than the radius of the inner peripheries of the rings, means mounted within the space defined by the inner periphery of the ring for driving the soil in opposite lateral directions and through the spiders.

5. A farming implement comprising an axle, a frame carrying the axle, a pair of spaced spiders rotatable on the axle, a gear connected to one of the spiders and rotatable with said spider on the axle, cutting rings located in spaced relation about the axle, the legs of the spiders being rigidly connected to the outwardly disposed cutting rings, rods connecting all of the rings for simultaneous operation, a counter shaft supported from the axle, cutting hoes located in spaced relation and rigidly connected with the counter shaft, a gear on the counter shaft, and means connecting the gear on the spider with the gear on the counter shaft for causing rotation of the counter shaft and the cutting hoes when the spiders are rotated by the implement being carried over the ground, said cutting hoes being rotated between the spaced rings, and means for driving the soil laterally through the spider.

6. A farming implement comprising an axle, a frame carrying the axle, a pair of spaced spiders rotatable on the axle, a gear connected to one of the spiders and rotatable with said spider on the axle, cutting rings located in spaced relation about the axle, the legs of the spiders being rigidly connected to the outwardly disposed cutting rings, rods connecting all of the rings for simultaneous operation, a counter shaft supported from the axle, cutting hoes located in spaced relation and rigidly connected with the counter shaft, a gear on the counter shaft, and means connecting the gear on the spider with the gear on the counter shaft for causing rotation of the counter shaft and the cutting hoes when the spiders are rotated by the implement being carried over the ground, said cutting hoes being rotated between the spaced rings, and means located within the space defined by the rings for causing the soil to be forced in opposite lateral directions through the spiders.

7. A farming implement comprising an axle, a frame carrying the axle, a pair of spaced spiders rotatable on the axle, a gear connected to one of the spiders and rotatable with said spider on the axle, cutting rings located in spaced relation about the axle, the legs of the spiders being rigidly connected to the outwardly disposed cutting rings, rods connecting all of the rings for simultaneous operation, a counter shaft supported from the axle, cutting hoes located in spaced relation and rigidly connected with the counter shaft, a gear on the counter shaft, means connecting the gear on the spider with the gear on the counter shaft for causing rotation of the counter shaft and the cutting hoes when the spiders are rotated by the implement being carried over the ground, said cutting hoes being rotated between the spaced rings, means located within the space defined by the rings for causing the soil to be forced in opposite lateral directions through the spiders, and means for causing the soil to be replaced in its normal position.

JOHN VERSTEEG.